US009600267B2

(12) United States Patent
Chefalas et al.

(10) Patent No.: US 9,600,267 B2
(45) Date of Patent: Mar. 21, 2017

(54) OPTIMIZING PROVISIONING THROUGH AUTOMATED VIRTUAL MACHINE TEMPLATE GENERATION (71) Applicant: International Business Machines Corporation, Armonk, NY (US)

(72) Inventors: Thomas E. Chefalas, Somers, NY (US); David M. Egle, Rochester, MN (US); Daniel L. Hiebert, Pine Island, MN (US); Dennis D. Jurgensen, Chapel Hill, NC (US); Arthur J. Meyer, III, Rochester, MN (US); David M. Schultz, Williston, VT (US); Peter A. Singh, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/739,006

(22) Filed: Jun. 15, 2015

(65) Prior Publication Data

US 2016/0364255 A1 Dec. 15, 2016

(51) Int. Cl.
*G06F 9/455* (2006.01)
*G06F 9/44* (2006.01)
(Continued)

(52) U.S. Cl.
CPC .......... *G06F 8/65* (2013.01); *G06F 8/60* (2013.01); *G06F 8/61* (2013.01); *G06F 8/62* (2013.01); *G06F 8/63* (2013.01); *G06F 8/67* (2013.01); *G06F 8/70* (2013.01); *G06F 8/71* (2013.01); *G06F 9/455* (2013.01); *G06F 9/45558* (2013.01); *H04L 43/16* (2013.01); *H04L 67/10* (2013.01); *G06F 2009/4557* (2013.01);
(Continued)

(58) Field of Classification Search
None
See application file for complete search history.

(56) References Cited

U.S. PATENT DOCUMENTS

2001/0021899 A1\* 9/2001 Schinkowitsch ... G01R 31/31816 702/119
2007/0271561 A1\* 11/2007 Winner ............... G06F 8/65 718/1

(Continued)

OTHER PUBLICATIONS

Jeswani et al, "ImageElves: Rapid and Reliable System Updates in the Cloud", 2013, IEEE, pp. 390-399.\*

(Continued)

*Primary Examiner* — Charles Swift
(74) *Attorney, Agent, or Firm* — William H. Hartwell (57) ABSTRACT Software that dynamically updates virtual machine templates at deterministic intervals in order to reduce patching time, by performing the following operations: (i) identifying a virtual machine (VM) provisioned according to a first VM template; (ii) initiating a patching process that applies a set of patch(es) to the VM, thereby creating a patched VM; (iii) determining that an amount of time taken to complete the patching process is greater than a predetermined threshold; and (iv) responsive to determining that the amount of time taken to complete the patching process is greater than the predetermined threshold, generating a second VM template based, at least in part, on the patched VM.

20 Claims, 6 Drawing Sheets (51) Int. Cl.
  *G06F 9/445* (2006.01)
  *H04L 12/26* (2006.01)
  *H04L 29/08* (2006.01)

(52) U.S. Cl.
  CPC .............. *G06F 2009/45562* (2013.01); *G06F 2009/45575* (2013.01); *G06F 2009/45591* (2013.01); *G06F 2009/45595* (2013.01)

(56) References Cited

U.S. PATENT DOCUMENTS

| | | | |
|---|---|---|---|
| 2009/0007105 A1 | 1/2009 | Fries et al. | |
| 2011/0314447 A1* | 12/2011 | Malyshev | G06F 8/60 717/110 |
| 2013/0074072 A1* | 3/2013 | Kennedy | G06F 9/44505 718/1 |
| 2014/0229939 A1 | 8/2014 | Dias de Assuncao et al. | |
| 2014/0257863 A1* | 9/2014 | Maastricht | G06Q 40/08 705/4 |
| 2015/0074659 A1* | 3/2015 | Madsen | G06F 8/61 717/177 |
| 2015/0081910 A1* | 3/2015 | Assuncao | G06F 9/5055 709/226 |
| 2015/0301818 A1* | 10/2015 | Voronkov | G06F 8/65 717/168 |

OTHER PUBLICATIONS

Mell, P. et al. "The NIST Definition of Cloud Computing", Recommendations of the National Institute of Standards and Technology. U.S. Department of Commerce. Special Publication 800-145. Seven pages. Sep. 2011. Gaithersburg, MD.

\* cited by examiner

OPTIMIZING PROVISIONING THROUGH AUTOMATED VIRTUAL MACHINE TEMPLATE GENERATION

BACKGROUND

The present invention relates generally to the field of cloud computing, and more particularly to managing virtual devices in a cloud computing environment.

Cloud computing is the delivery of computing as a service rather than a product, whereby shared resources, software, and information are provided to computers and other devices as a utility over a network (typically the Internet). An enabling technology for cloud computing is virtualization. Virtualization software allows a physical computing device to be electronically separated into one or more "virtual" devices, each of which can be easily used and managed to perform computing tasks. Some cloud computing providers manage virtual devices using services such as anti-virus, backup, disaster recovery, monitoring, health-check, security, and patching, for example (where the service of managing virtual devices in a cloud computing environment is sometimes referred to as a "managed cloud service" and/or a "cloud managed service").

Patching is a known service for managing virtual devices in a cloud computing environment. Generally speaking, patching involves updating provisioned virtual machines (VMs) by obtaining and applying approved operating system and software patches. In many cloud computing environments, a new VM is created by deploying a VM template, a reusable image created from a VM (or, more specifically, a snapshot of a VM at a certain place in time).

SUMMARY

According to an aspect of the present invention, there is a method, computer program product and/or system that performs the following operations (not necessarily in the following order): (i) identifying a virtual machine (VM) provisioned according to a first VM template; (ii) initiating a patching process that applies a set of patch(es) to the VM, thereby creating a patched VM; (iii) determining that an amount of time taken to complete the patching process is greater than a predetermined threshold; and (iv) responsive to determining that the amount of time taken to complete the patching process is greater than the predetermined threshold, generating a second VM template based, at least in part, on the patched VM.

DETAILED DESCRIPTION

In typical cloud computing environments, virtual machines (VMs) are provisioned based on preexisting VM templates. When new software updates (or "patches") need to be installed on these virtual machines, the patches are applied directly to the virtual machines, which can be a time consuming and resource intensive process. Embodiments of the present invention dynamically update VM templates at deterministic intervals in order to reduce "patching" time. More specifically, certain embodiments of the present invention dynamically update VM templates once a threshold of time has been breached by the patching process. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
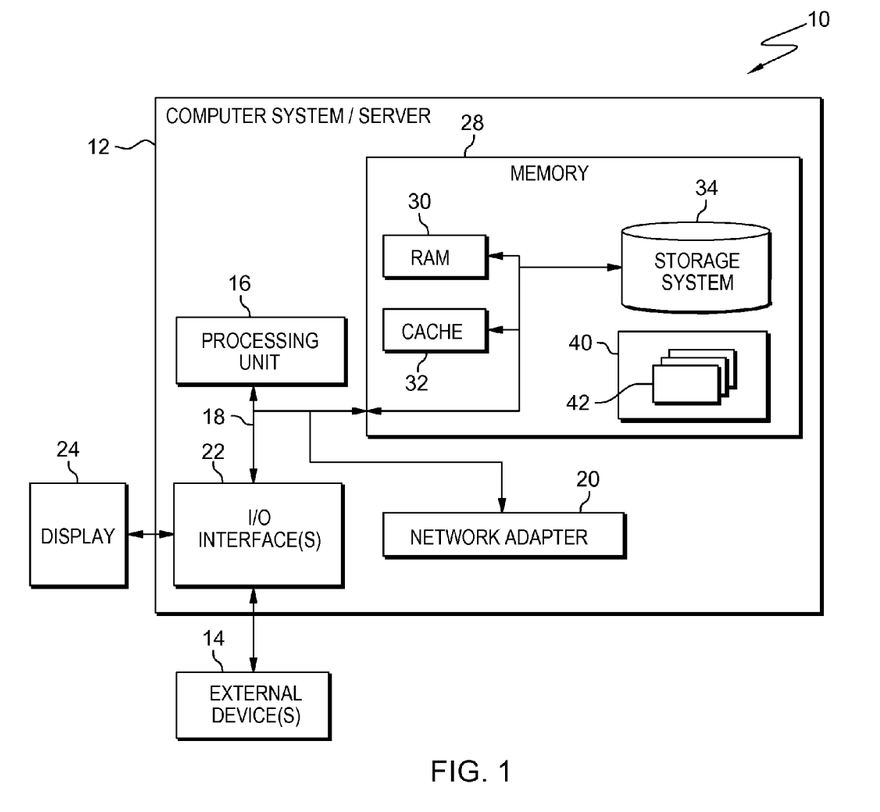
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
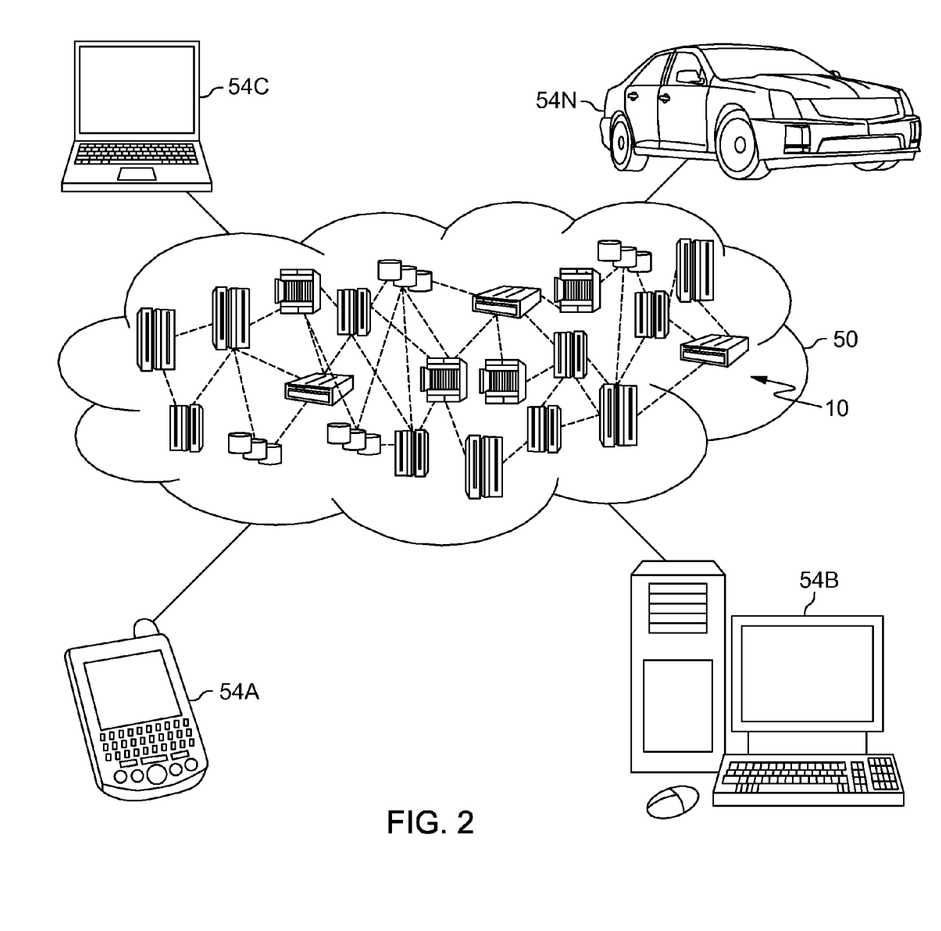
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
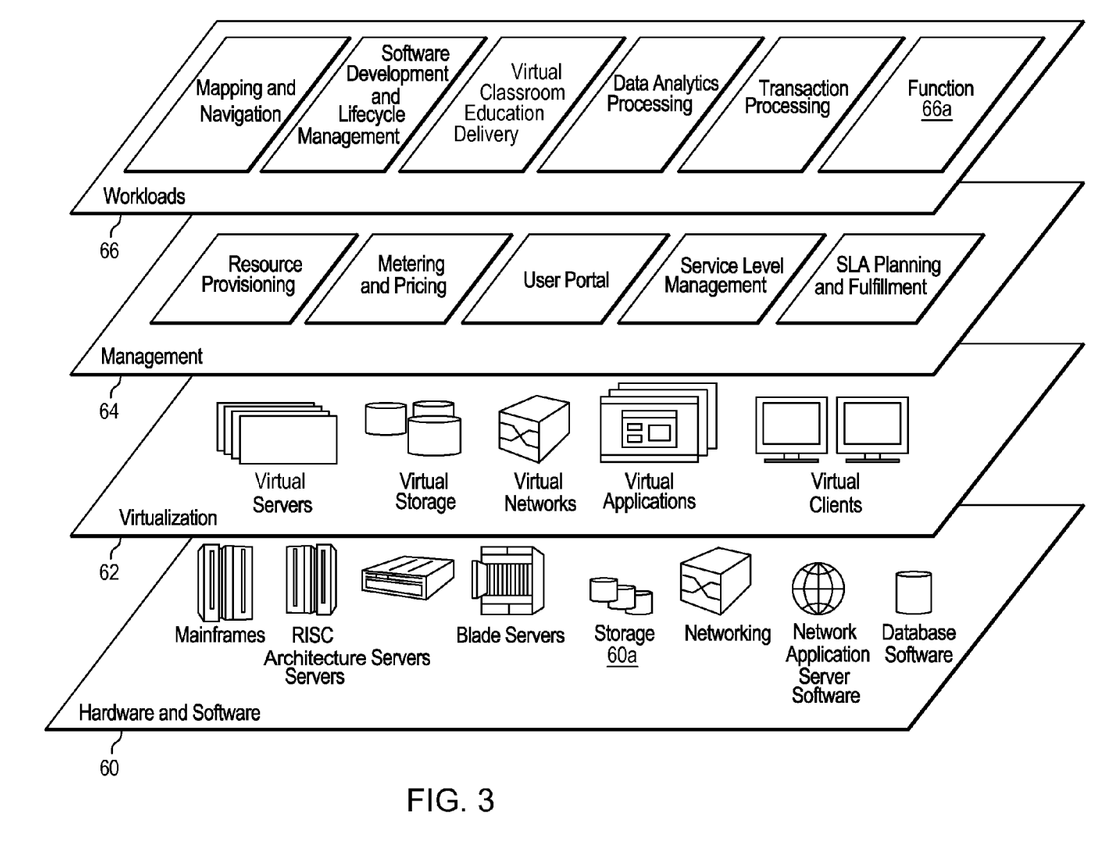
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
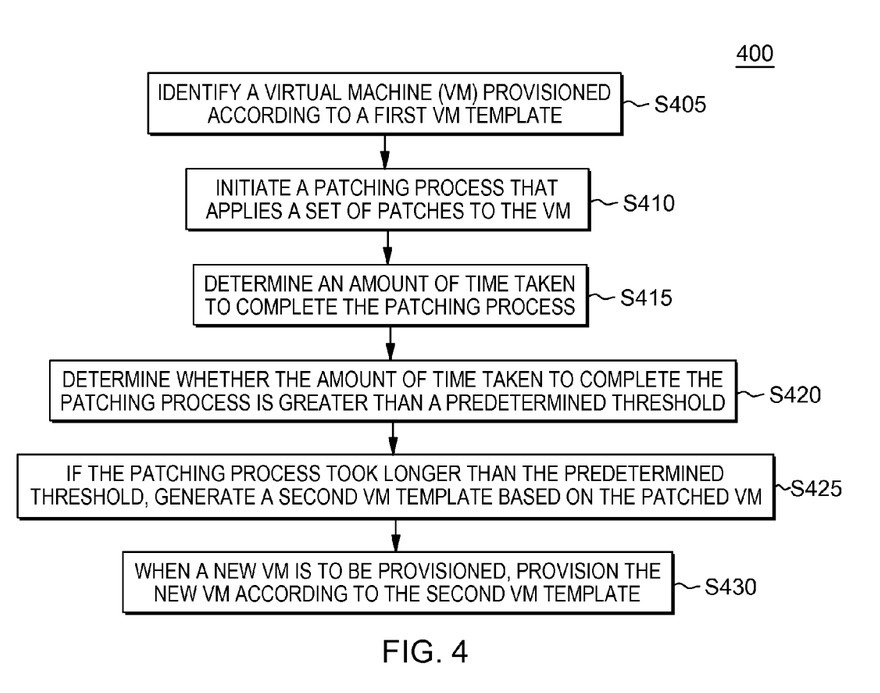
FIG. 4 is a flowchart showing a first embodiment method performed, at least in part, by the first embodiment system.
Figure 5:
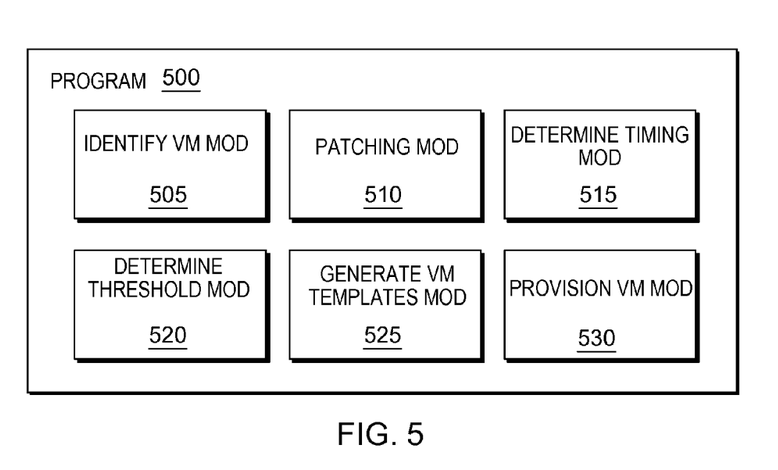
FIG. 5 is a block diagram showing a machine logic (for example, software) portion of the first embodiment system.

FIG. 4 shows flowchart 400 depicting a method according to the present invention. FIG. 5 shows program 500 for performing at least some of the method operations of flowchart 400. This method and associated software will now be discussed, over the course of the following paragraphs, with extensive reference to FIG. 4 (for the method operation blocks) and FIG. 5 (for the software blocks). One physical location where program 500 of FIG. 5 may be stored is in storage block 60a (see FIG. 3). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

FIG. 4 and FIG. 5. refer to a method and associated software for dynamically updating virtual machine (VM)

templates in order to reduce an amount of time required to patch VMs provisioned according to those templates. Generally speaking, provisioning a VM includes creating/installing the VM and provisioning the various resources necessary for utilization of the VM. In many cloud computing environments, VMs are provisioned according to VM templates, which define a "beginning" or "default" state for a VM being provisioned. In many cases (including in some embodiments of the present invention), VM templates are created from snapshots of existing VMs, where a snapshot of a VM is a copy of the VM captured at a certain point in time. A VM (and its corresponding snapshot) may include a wide variety of information, including, but certainly not limited to: (i) log files; (ii) the state of the VM's BIOS; (iii) the contents of the VM's disk drive(s); (iv) the contents of the VM's memory (and/or a corresponding paging file); and/or (v) configuration data. In some embodiments, VM templates are, in fact, VM snapshots, while in other embodiments, VM templates include computer program instructions adapted to recreate the conditions present in VM snapshots (including, for example, the log files, configuration files, disk drive contents, memory contents, and BIOS information mentioned above).

Processing begins at operation S405, where identify VM module ("mod") 505 identifies a virtual machine (VM) provisioned according to a first VM template. In this embodiment, a purpose of identifying the VM is to determine whether the particular VM is provisioned according to an inefficient or outdated VM template. As such, any VM present in the cloud computing environment of this embodiment may be identified in the step. In some embodiments, the identification of the VM occurs automatically, shortly after the VM has been provisioned. In other embodiments, identify VM mod 505 is initialized by an advisor module adapted to identify potential VMs (and corresponding templates) for optimizing. However, these examples are not meant to be limiting, and identify VM mod 505 may identify VMs provisioned according to VM templates using any known (or yet to be known) methods.

Processing proceeds to operation S410, where patching mod 510 initiates a patching process that applies a set of patches to the VM (thereby creating a "patched VM"). In many cases, including in the present example embodiment, the patching process is a managed service in a cloud computing environment. Furthermore, as used herein, a "patch" is any update that is to be applied to a VM. In some embodiments (including the present example embodiment), a patch is an update to the VM's operating system or to software running on the VM. However, this is not always the case. In some embodiments, patches include, for example: (i) new and/or replacement files for the VM's disk drive(s); (ii) instructions for duplicating, moving, and/or deleting files located on the VM's disk drive(s); (iii) new and/or replacement configuration files for the VM; and/or (iv) instructions for performing a set of actions on the VM.

Processing proceeds to operation S415, where determine timing mod 515 determines an amount of time taken to complete the patching process. The determination of the amount of time taken to complete the patching process may include any of a wide variety of known (or yet to be known methods). In some embodiments, the determination includes: (i) recording a first timestamp at the time that the patching process is initiated; (ii) recording a second timestamp at the time that the patching process is completed; and (iii) calculating a difference between the first timestamp and the second timestamp. In other embodiments, the determination includes recording the amount of time that it takes for each of a plurality of patching subprocesses to complete, and calculating the sum of those recorded amounts of time. In still other (or the same) embodiments, the determination includes performing additional calculations to accommodate for events that occur during patching that affect the overall time taken to complete the patching process. For example, in one embodiment, a system outage causes the patching process to take longer than it normally would have under typical circumstances. In this embodiment, determine timing mod 515 may subtract an amount of time corresponding to the system outage from the overall patching process time, in order to better represent the amount of time that that patching process would have taken under typical circumstances.

Processing proceeds to operation S420, where determine threshold mod 520 determines whether the amount of time taken to complete the patching process is greater than a predetermined threshold. The predetermined threshold may include a wide variety of possible durations (for example, one minute, one hour, one day, etc.) and may be determined using a wide variety of known (or yet to be known) threshold determining methods. In certain embodiments, a cost function is used to determine the threshold. In these embodiments, for example, the cost function determines an amount of time that must elapse before the cost (for example, the resource cost) of patching the VM is greater than the cost of creating a new VM template that already includes the patches. In other embodiments, the predetermined threshold may simply be set by a user/administrator of the cloud computing environment.

It should be noted that in alternate embodiments, the threshold need not necessarily: (i) be predetermined; and/or (ii) be an amount of time. For example, in some embodiments, instead of being predetermined, the threshold may, in fact, be determined automatically based on machine logic. Or, in some embodiments, instead of being an amount of time, the threshold may be a number of patch installations performed on the VM, where the threshold is met once the VM has received a certain number of patches (for example, 10 patches). These examples are not meant to be limiting, however, and the threshold may include any of a wide variety of known (or yet to be known) thresholds capable of indicating that a new VM template should be created.

In certain embodiments of the present invention, determine threshold mod 520 may consider an aggregate amount of time taken to complete multiple patching processes (also sometimes referred to as patching "subprocesses") when determining whether the threshold has been met. In these embodiments, the number of patching subprocesses to aggregate may be set manually by a user or may be determined by a hardware and/or software module (such as mod 520) of the cloud computing environment. For example, in certain embodiments, a cost function (that is, a cost function different from the cost function discussed in the previous paragraph) is used to determine whether the amount of time taken to complete a plurality of patching subprocesses is more expensive than simply updating one or more VM templates to include the patches included in the patching subprocesses.

Processing proceeds to operation S425, where, on condition that the patching process was determined (in operation S420) to have exceeded the predetermined threshold, generate VM templates mod 525 generates a second VM template based, at least in part, on the patched VM. Stated another way, in this operation, if the patching process exceed (for example, took longer than) the predetermined threshold, mod 525 creates a new VM template using the patched VM as a model. As a result, the second VM template will include the patches from the patching process, thereby reducing the number of post-provisioning patches that need to be applied to VMs provisioned according to the second VM template. In many embodiments, the generating of the second VM template includes creating a snapshot of the patched VM after the patching process has completed. The snapshot may then be: (i) used as the second VM template; and/or (ii) be used in generating the second VM template.

Processing proceeds to operation S430, where, when a new VM is to be provisioned, provision VM mod 530 provisions the new VM according to the second VM template. Or, stated another way, when it comes time to provision a new VM according to the first VM template, provision VM mod 530 replaces the first VM template with the second VM template. As a result, the newly provisioned VM will already include the patches that had previously been applied to the first VM (that is, the VM identified in operation S405), thereby reducing the amount of time during which the new VM will need to be subjected to patching processes. In some embodiments, the first VM template is deleted, as it is no longer needed for provisioning new VMs. In other embodiments, the first VM is kept for backup purposes or other reasons.

III. Further Comments and/or Embodiments

Some embodiments of the present invention recognize the following facts, potential problems and/or potential areas for improvement with respect to the current state of the art: (i) the length of time required to patch a provisioned virtual machine (VM) becomes greater over time; (ii) the length of time required to patch a provisioned VM can render a VM unusable during a target frame of availability; (iii) the process of patching a VM can monopolize network traffic (for example, when many provisioned VMs are being patched); (iv) existing VM templates are created at specified time intervals (for example, every 2 months, or every 90 days); (v) outdated VMs (for example, VMs created from outdated templates) may take a long time to patch; and/or (vi) if many patches are released over a short period of time (and/or prior to an update to a VM template), the patches can be time consuming to implement.

Some embodiments of the present invention dynamically update VM templates at deterministic intervals in order to reduce the cloud managed service "patching" time. For example, some embodiments dynamically update VM templates once a threshold of time has been breached by the patching process. In these embodiments, an algorithm can be used within a control program to dynamically generate a new VM template (for future provisioning) from a provisioned VM when: (i) the patch managed service completes; and (ii) the time to compete the patch managed service has exceeded a specified time threshold.

Figure 6:
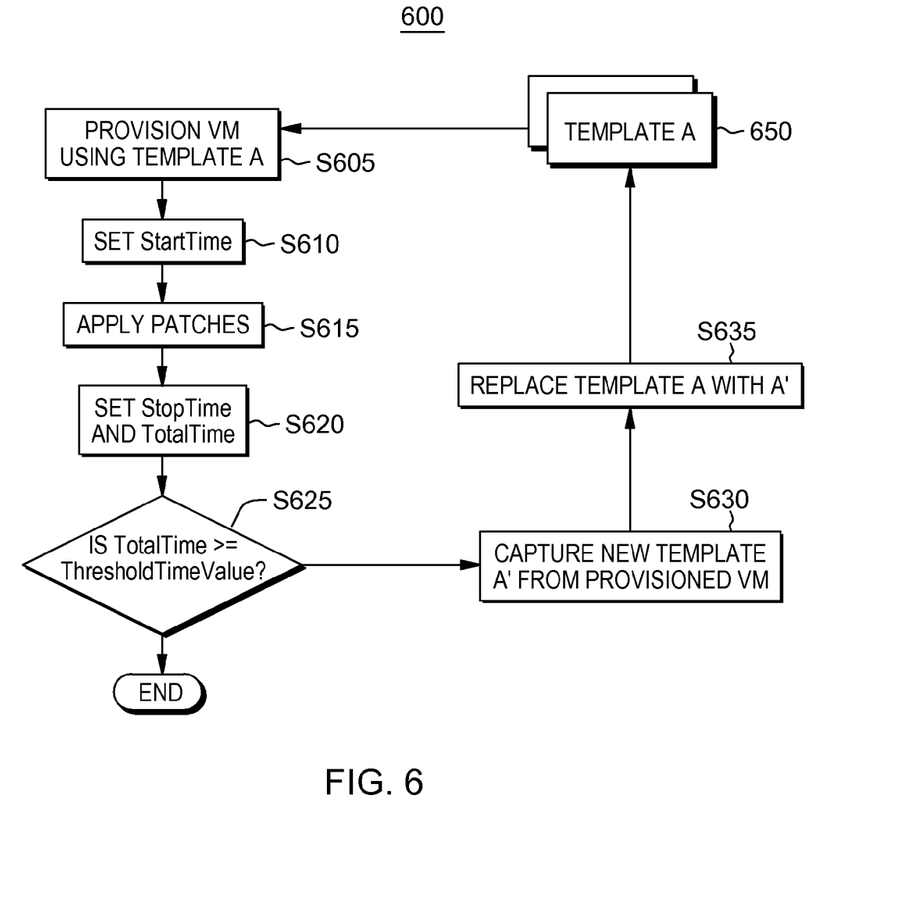
FIG. 6 is a flowchart showing a second embodiment method performed, at least in part, by a second embodiment system.

FIG. 6 shows flowchart 600 depicting a method for updating VM templates according to the present invention (where the method is performed, at least in part, by a second embodiment system, discussed below). In some embodiments, the method is performed automatically (for example, upon installation of a VM according to a VM template). In other embodiments, the method is performed by an advisor module.

Processing begins at operation S605, where a control program provisions a new VM using template A 650. Processing then proceeds to operation S610, where the control program records a start time for the patch process. In this embodiment, the start time is set to a variable called "StartTime".

Processing proceeds to operation S615, where the control program initiates the patching process on the provisioned VM, applying a set of patches to the VM.

Processing proceeds to operation S620, where, once the patching process is complete, the control program records the stop time for the patch process. In this embodiment, the stop time is set to a variable called "StopTime". Once the stop time has been recorded, the control program computes the total time taken for patching by subtracting the start time from the stop time (for example, by calculating "StopTime–StartTime"). In this embodiment, the total time is set to a variable called "TotalTime".

Processing proceeds to operation S625, where the control program determines whether the total time is greater than a pre-determined threshold value (for example, 1 hour) where, in this embodiment, the pre-determined threshold is stored in a variable called "ThresholdTimeValue". If the total time is not greater than the threshold value, processing ends. However, if the total time is greater than the threshold value, processing proceeds to operation S630, where the control program captures a new template A' from the provisioned VM. In this embodiment, template A' is captured by taking a snapshot of the patched VM. Processing then proceeds to operation S635, where template A 650 is replaced by template A', and template A' is used for subsequent provisioning activity.

Figure 7:
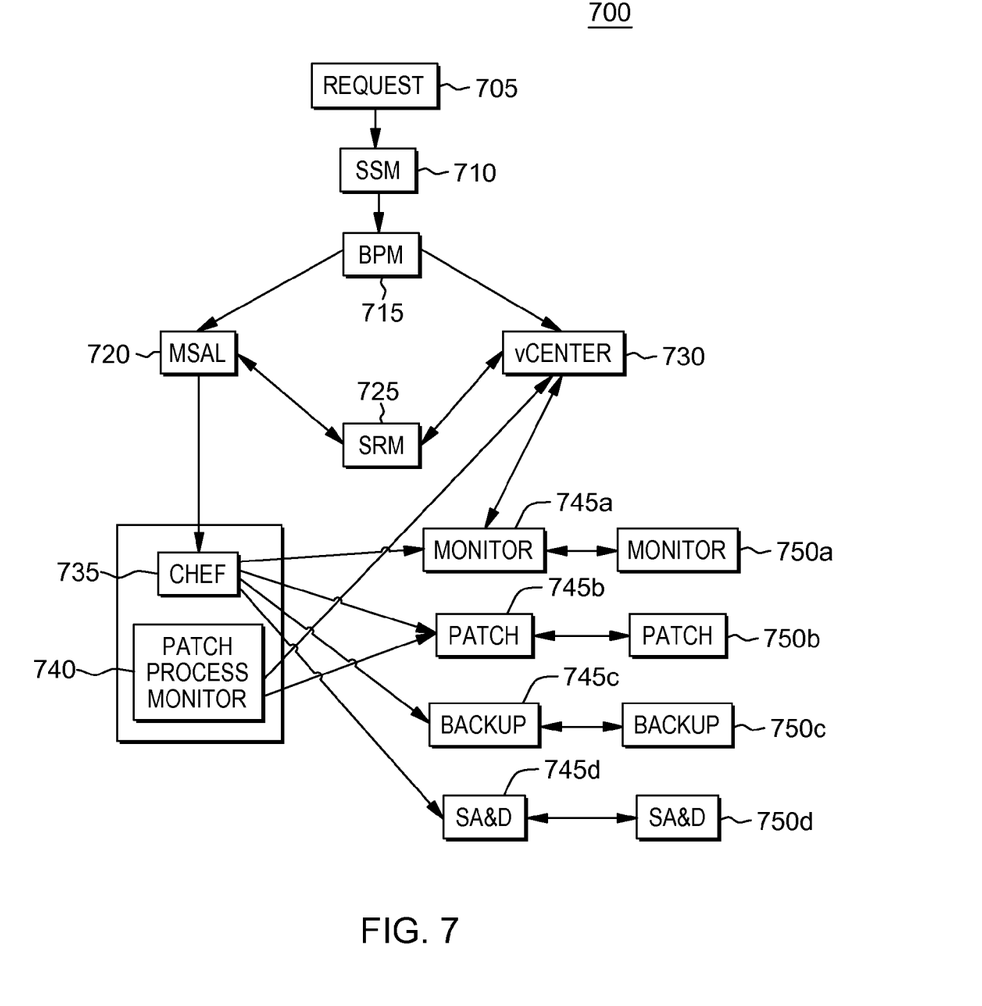
FIG. 7 depicts an embodiment of a cloud computing environment (specifically, the second embodiment system) according to the present invention.

FIG. 7 shows system 700 according to an embodiment of a cloud computing environment according to the present invention (specifically, the second embodiment system). As shown in FIG. 7, request 705 is received by site service mediator (SSM) 710, and SSM 710 send the request to business process manager (BPM) 715. The request includes a payload that provides details relating to the various aspects of the request. For example, if the request (or an aspect of the request) is to deploy a virtual machine, the request contains both the virtual machine configuration as well as configuration of the VM's operating system. Or, if the request involves installing a managed service agent, then the request includes all of the configuration information from that agent. Referring back to the method discussed in relation to FIG. 6, "requests" generated by the method and performed by system 700 may include, for example: (i) provisioning a VM (see operation S605); (ii) applying patches (see operation S615); (iii) capturing a new template A' (see operation S630); and/or (iv) replacing template A 650 with template A' (see operation S635).

Referring still to FIG. 7, information regarding the request may be sent to vCenter 730 or managed services abstraction layer (MSAL) 720. MSAL 720 provides configuration, installing, and un-installing managed services. MSAL 720 works in concert with chef 735, which provides various "recipes" to perform those configurations, installations, and uninstallations. vCenter 730 manages the life cycle of virtual machines. Some of vCenter 730's management tasks include, but are not limited to: deployment, customization, powering on, shutdown, reboot, taking snapshots, and/or restoring snapshots. Both vCenter 730 and MSAL 720 are connected to storage resource manager (SRM) 725, which provides templates for OS deployments (and is a possible storage location for template A 650 and template A').

In some situations, chef 735 installs agent instances 745a, 745b, 745c, and 745d for monitoring, patching, backup, and SA&D ("Service Activation and Deactivation"), respectively. These agent instances are powered by backend servers 750a, 750b, 750c, and 750d, which provide the managed services for monitoring, patching, backup, and SA&D, respectively. When the method depicted in flowchart 600 applies patches to the provisioned VM (see operation S615, discussed above), one or more agent instances (for example, instance 745b) are created from backend server 750b).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    identifying, by one or more processors, a virtual machine (VM) provisioned according to a first VM template;
    initiating, by one or more processors, a patching process that applies a set of patch(es) to the VM, thereby creating a patched VM;
    determining, by one or more processors, a patch threshold based, at least in part, on a cost function, wherein the patch threshold is an amount of time that must elapse before a resource cost of completing the patching process is greater than a resource cost of creating a new VM template that already includes the set of patch(es);
    determining, by one or more processors, that an amount of time taken to complete the patching process is greater than the patch threshold; and
    responsive to determining that the amount of time taken to complete the patching process is greater than the patch threshold, generating, by one or more processors, a second VM template based, at least in part, on the patched VM.

2. The method of claim 1, wherein the patching process is a managed service in a cloud computing environment.

3. The method of claim 1, further comprising provisioning, by one or more processors, a new VM according to the second VM template.

4. The method of claim 1, further comprising replacing, by one or more processors, the first VM template with the second VM template.

5. The method of claim 1, wherein the determining that the amount of time taken to complete the patching process is greater than the patch threshold comprises:
    recording a first timestamp at the time that the patching process is initiated;
    recording a second timestamp at the time that the patching process is completed; and
    calculating a difference between the first timestamp and the second timestamp.

6. The method of claim 1, wherein the generating of the second VM template comprises creating a snapshot of the patched VM after the patching process has completed.

7. The method of claim 1, wherein:
    the patching process includes a plurality of patching subprocesses; and
    the amount of time taken to complete the patching process is an aggregate amount of time to complete each of the corresponding patching subprocesses.

8. A computer program product comprising a computer readable storage medium having stored thereon:
    instructions executable by a device to cause the device to identify a virtual machine (VM) provisioned according to a first VM template;
    instructions executable by the device to cause the device to initiate a patching process that applies a set of patch(es) to the VM, thereby creating a patched VM;
    instructions executable by the device to cause the device to determine a patch threshold based, at least in part, on a cost function, wherein the patch threshold is an amount of time that must elapse before a resource cost of completing the patching process is greater than a resource cost of creating a new VM template that already includes the set of patch(es);
    instructions executable by the device to cause the device to determine that an amount of time taken to complete the patching process is greater than the patch threshold; and
    instructions executable by the device to cause the device to, responsive to determining that the amount of time taken to complete the patching process is greater than the patch threshold, generate a second VM template based, at least in part, on the patched VM.

9. The computer program product of claim 8, wherein the patching process is a managed service in a cloud computing environment.

10. The computer program product of claim 8, further comprising instructions executable by the device to cause the device to provision a new VM according to the second VM template.

11. The computer program product of claim 8, further comprising instructions executable by the device to cause the device to replace the first VM template with the second VM template.

12. The computer program product of claim 8, wherein the determining that the amount of time taken to complete the patching process is greater than the patch threshold comprises:
- recording a first timestamp at the time that the patching process is initiated;
- recording a second timestamp at the time that the patching process is completed; and
- calculating a difference between the first timestamp and the second timestamp.

13. The computer program product of claim 8, wherein the generating of the second VM template comprises creating a snapshot of the patched VM after the patching process has completed.

14. The computer program product of claim 8, wherein:
- the patching process includes a plurality of patching subprocesses; and
- the amount of time taken to complete the patching process is an aggregate amount of time to complete each of the corresponding patching subprocesses.

15. A computer system comprising:
- a processor(s) set; and
- a computer readable storage medium;
- wherein:
  - the processor set is structured, located, connected and/or programmed to execute instructions stored on the computer readable storage medium; and
  - the instructions include:
    - instructions executable by the processor set to cause the system to identify a virtual machine (VM) provisioned according to a first VM template;
    - instructions executable by the processor set to cause the system to initiate a patching process that applies a set of patch(es) to the VM, thereby creating a patched VM;
    - instructions executable by the processor set to cause the system to determine a patch threshold based, at least in part, on a cost function, wherein the patch threshold is an amount of time that must elapse before a resource cost of completing the patching process is greater than a resource cost of creating a new VM template that already includes the set of patch(es);
    - instructions executable by the processor set to cause the system to determine that an amount of time taken to complete the patching process is greater than the patch threshold; and
    - instructions executable processor set to cause the system to, responsive to determining that the amount of time taken to complete the patching process is greater than the patch threshold, generate a second VM template based, at least in part, on the patched VM.

16. The computer system of claim 15, wherein the patching process is a managed service in a cloud computing environment.

17. The computer system of claim 15, wherein the instructions further include instructions executable by the processor set to cause the system to provision a new VM according to the second VM template.

18. The computer system of claim 15, wherein the instructions further include instructions executable by the processor set to cause the system to replace the first VM template with the second VM template.

19. The computer system of claim 15, wherein the determining that the amount of time taken to complete the patching process is greater than the patch threshold comprises:
- recording a first timestamp at the time that the patching process is initiated;
- recording a second timestamp at the time that the patching process is completed; and
- calculating a difference between the first timestamp and the second timestamp.

20. The computer system of claim 15, wherein:
- the patching process includes a plurality of patching subprocesses; and
- the amount of time taken to complete the patching process is an aggregate amount of time to complete each of the corresponding patching subprocesses.

* * * * *